United States Patent [19]

Erlenbach

[11] Patent Number: 4,685,872
[45] Date of Patent: Aug. 11, 1987

[54] MACHINE FOR THE PRODUCTION OF MOLDED PARTS FROM FOAMED PLASTIC

[76] Inventor: Hans Erlenbach, Hermann-Lons-Strasse 13, Nastatten D-5428, Fed. Rep. of Germany

[21] Appl. No.: 875,207

[22] Filed: Jun. 17, 1986

[30] Foreign Application Priority Data

Feb. 1, 1986 [DE] Fed. Rep. of Germany ....... 3603108

[51] Int. Cl.⁴ ............................................. B29C 67/20
[52] U.S. Cl. .................................. 425/4 R; 264/40.3; 264/41; 264/50; 264/51; 425/145; 425/146; 425/149
[58] Field of Search ............... 425/4 R, 4 C, 145, 146, 425/149; 264/40.3, 41, 50, 51; 422/131, 133; 521/917; 261/18 R, 87, 93, DIG. 26

[56] References Cited

U.S. PATENT DOCUMENTS

| 3,676,033 | 7/1972 | Buonaiuto | 425/4 R X |
| 3,692,442 | 9/1972 | Gerbert | 425/4 R |
| 3,926,219 | 12/1975 | Ersfeld et al. | 425/4 R X |
| 4,327,045 | 4/1982 | Nishikawa et al. | 264/51 |
| 4,381,272 | 4/1983 | Ehritt | 264/40.3 |
| 4,390,332 | 6/1983 | Hendry | 264/50 X |
| 4,399,105 | 8/1983 | Tilgner et al. | 422/133 X |
| 4,474,717 | 10/1984 | Hendry | 264/50 X |

FOREIGN PATENT DOCUMENTS 1629316 11/1978 Fed. Rep. of Germany .
2542452 12/1979 Fed. Rep. of Germany .
3408434 9/1985 Fed. Rep. of Germany .

Primary Examiner—Richard L. Chiesa
Attorney, Agent, or Firm—H. Gibner Lehmann; K. Gibner Lehmann

[57] ABSTRACT

An improved machine for the production of foamed plastic molded parts, including soft foam plastics, i.e. for processing particles without foaming capacity, and including the processing of greatly frothed plastic foam particles, i.e. particles with but little foaming capacity, is obtained in that a pressure equalization system is provided which creates virtually equal pressure conditions while the mold cavity is being filled, i.e. the same overpressure in the material supply line as in the mold cavity. This makes it possible to introduce the foam particles, already compressed in the material supply system, into the mold cavity in a continuous flow by means of an injector, with excess foam particles being blown back into a tank provided in the material supply system by the injector after the mold cavity is filled. Due to this operating principle, the machine can be designed so that it can be set up for the processing of different materials such as soft foam particles, rigid foam particles and greatly expanded rigid foam particles.

21 Claims, 4 Drawing Figures

MACHINE FOR THE PRODUCTION OF MOLDED PARTS FROM FOAMED PLASTIC

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates to machines for the production of molded parts from foamed plastic, including soft foam plastics such as expanded olefin polymers and including plastic foam particles greatly expanded in frothing, which machines are provided with a molding die to be filled with expanded or with more or less frothed plastic particles under previously determined gas pressure conditions in its cavity, and which machines have a compressed gas operated filling device for the expanded particles which are disposed in the material supply line to the molding die.

2. Description of the Related Art Including Information Disclosed Under 37 CFR §§1.97-1.99

While the production of molded parts from rigid foamed plastic is generally well manageable regarding the filling of the frothed plastic particles into the mold cavity, due to the plastic particles still retaining a considerable residual foaming capacity, the production of molded parts from soft foamed plastic and the production of molded parts from rigid foamed plastics of very low density pose the problem of filling the mold cavities under overpressure so that those plastic particles having no or only very little foaming capacity left, make contact with the proper surfaces under sufficient pressure whereby they can be welded together sufficiently by introducing steam.

In this connection, it is known from German Publication DE-AS No. 16 29 316 to fill those plastic particles having no foaming capacity left, e. g. foamed ethylene polymer particles, into a mold cavity and then reduce the volume of the mold cavity to 90 percent–40 percent of the original bulk volume of the foam articles filled in. But this can be done only with very simple molded parts such as cubes or plates and requires relatively complicated molding dies.

A method for the production of molded parts of foamed olefin polymers is known from German Publication DE-AS No. 25 42 452 in which the foam particles are to be introduced into the mold cavity by compressing them to 20 percent–80 percent of the original volume against a back pressure which is to be relieved after the mold cavity is filled and before the plastic particles are heated and fused together. In practice, filling the cavity with the foamed particles against the back pressure presents difficulties not recognized in the German Publication DE-AS No. 25 42 452. In particular, filling a mold cavity adequately in its corner areas and edge areas has been impossible when filling against back pressure in the method known from Publication DE-AS No. 25 42 452.

To overcome the difficulties occurring when filling the mold cavity against back pressure, a machine is known from German Publication DE-OS No. 34 08 434 in which the foam particles to be filled into the mold cavity are measured in relatively small portions in dosing chambers and are "shot" portion by portion into the mold cavity under high pressure. Depending on the size of the molded part to be produced, such portions must be shot consecutively into the mold cavity in large numbers, e.g. 100 such portions. Apart from the high mechanical costs, this consecutive "shooting" of portions into the mold cavity requires long filling times. Since measuring the portions in the dosing chamber is associated with considerable fluctuations and inaccuracies, there result substantial variations in the degree to which the mold cavity is filled, which leads to areas of poor fusing on the molded part if the amount filled in is only slightly too little and to the reflux of foam particles in the supply line if the amount filled in is only slightly too great.

From the former case there results a very high percentage of scrap which is found in practice. The latter case, namely foam particles refluxing in the supply line, causes severe operating breakdowns leading to considerable machine downtime and necessitating costly measures for their elimination. Filling the mold cavity by "shooting in" portions of foam particles out of dosing chambers is not feasible with the necessary reliability if there are mold cavities with several filling points that must be charged because it is then impossible to assign definitely limited areas in the interior of the mold cavity to the individual filling points, and in consequence when the previously fixed number of portions is fed in, a reflux of foam particles will occur at one filling point and insufficient filling at the other filling point will be had with the predetermined number of fedin portions.

SUMMARY OF THE INVENTION

In contrast thereto it is an object of the present invention to provide an improved machine for the production of molded parts from foamed plastic, including soft foam plastic such as expanded olefin polymers and including plastic foam particles greatly expanded in frothing, in which machine a uniform filling of the foam particles into the mold cavity and a reliable conclusion of the feeding of foam particles is accomplished while still keeping the supply line free when the mold cavity is filled whether either one or several filling points are involved, even when the foam particles must be fed into the mold cavity under pressure in compressed form.

According to the invention, this problem is solved in that the filling device for each filling point has an injector, known per se, with at least one compressed gas operated injector nozzle disposed in the area of its outlet that is connected to the molding die, and a material guiding canal is disposed ahead of the injector nozzle in the direction of material travel and is connected via the material inlet to a material supply system, and in that the material guiding canal of the injector and the material supply system are connected or connectable to a pressure equalization system adapted to maintain in the material supply canal of the injector essentially the same gas pressure as in the mold cavity.

In contrast to the known filling in or "shooting in" of foam particles against a back pressure maintained in the mold cavity, there is formed in the machine according to the present invention a closed-pressure equalization system in which the requisite pressure appropriate for the respectively desired filling conditions and the material respectively to be processed is maintained. If foam particles compressible by the action of pressure, such as soft foam plastics, or rigid foam particles which have been greatly frothed and therefore have hardly any residual foaming capacity left are to be processed, these particles are pre-compressed in the material supply system. The compressed foam particles no longer have to overcome a back pressure when being introduced into the mold cavity, for which reason they can be blown into the mold cavity by the injector in a continuous flow.

When the mold cavity is filled, the transport gas flow which is fed to the injector nozzle or nozzles can be utilized to blow excess foam particles from the injector and the material supply system back into the respective storage tank. Consequently, in addition to a uniform, well-controlled flow of incoming material, there is had a precise filling of the mold cavity without the need for dosing chambers and effective cleaning of the material supply lines and of the injector, as by blowing, excellent operating reliability, is assured. Only after the mold cavity has been filled and the injector closed and only after the material supply lines are free of residual foam particles is it necessary to relieve the overpressure that is maintained in the mold cavity and in the pressure equalization system to enable the foam particles contained in the mold cavity to expand due to the pressure relief.

Since transport gas must be conducted through the injector nozzles at a considerably higher pressure for the operation of the injector than the pressure prevailing in the pressure equalization system, it is recommended within the scope of the invention to equip the pressure equalization system with a gas blow-off valve that is finely adjustable to the desired gas pressure, e. g. a pressure relief valve. The amount of gas fed to the pressure equalization system with the transport gas is thus constantly bled out of the pressure equalization system via the gas blow-off valve or pressure relief valve without generating pressure fluctuations.

The gas blow-off or pressure relief valve may be equipped with a program control unit for temporary variation of the overpressure maintained in the pressure equalization system and possibly for temporary application of ambient pressure to the pressure equalization system. By varying the overpressure maintained in the pressure equalization system during the filling process it is possible to vary the density of the molded parts produced locally and in reproducible manner. For example, greater density may be imparted to molded parts in areas specially stressed mechanically, such as in edge areas, than in less stressed areas, such as wall areas. By temporarily applying ambient pressure to the pressure equalization system the machine according to the invention can be operated like any conventional machine, for the production of rigid foam parts, i.e. it can be used for this purpose also.

If it is intended to use the machine of the present invention for the temporary production of rigid foam parts it is recommended further to provide in the pressure equalization system a valve for its selective interruption. With this valve it is possible to render the pressure equalization system ineffective selectively, but then the gas blow-off valve must normally be kept in the position where it is open to the surroundings. If this is to be avoided, the valve for the selective interruption of the pressure equalization system may be designed as a multi-way valve to connect to the surrounding areas that part of the pressure equalization valve which goes to the venting canal or venting canals of the molding die.

In a preferred embodiment of the invention, the material supply system contains a pressure filling tank which is adapted to accommodate an amount of material sufficient for at least one mold filling. The pressure filling tank can be closed gastight and is connected to the material inlet of the injector via a gastight material supply line. The pressure filling tank is included in the pressure equalization system by being connected to a pressure equalization line which is connected via a shut-off valve or valves to the venting canal or canals of the molding die. The pressure equalization line is equipped with a pressurization means. The pressure equalization system affects the mold cavity through the venting canal or canals of the molding die on the one hand and affects the material supply canal of the injector through the material supply system on the other hand.

This embodiment of the invention offers the particular advantage that the foam particles are subjected to the respectively desired pressure and are compressed in accordance with this pressure in the pressure filling tank that is already included in the pressure equalization system. The foam particles, already compressed in the pressure filling tank therefore, can be conducted in a smooth flow through the material supply line to the injector and through the material supply canal of the injector. The material flow from the pressure filling tank to the injector can be improved even further by providing at each material outlet of the pressure filling tank at least one inlet nozzle for a gaseous transport medium to dilute and accelerate the material flow through the material supply line to the injector.

This additional, gaseous transport medium may be taken from a separate transport medium source via an adjustable flow throttle and a shut-off valve. Since the transport medium blown through the injector nozzles constantly creates an excess of gas in the pressure equalization system which must be let off, gas from the pressure equalization system may also be supplied to the inlet nozzles at the pressure filling tank outlets as an additional transport medium. This is accomplished from the gas line of the pressure equalization system which goes to the pressure filling tank via an adjustable flow throttle.

Furthermore, in this preferred embodiment of the invention, the even flow of material from the pressure filling tank to the injector can also be improved by providing that the pressure filling tank contains in its lower region, preferably in its bottom, a peripheral series of plastics material outlets and an agitator wiping across the outlets. It may be provided in this connection that the agitator operates only during the filling process, while closing the plastics material outlets of the pressure filling tank during the rest of the time so that no material particles can get into the material supply line and the material supply canal of the injector outside of the filling process, especially not when replenishing the pressure filling tank from a raw material storage tank. This can be accomplished by equipping the agitator parts which wipe across the material outlets with covering elements adapted to fit the material outlets and with an arresting device which stops the agitator in such a position, when shutting off its drive, that the covering elements cover up the material outlets.

The machine according to the invention is preferably equipped with a program control unit for the work cycle. This program control unit maybe designed in the form of an electronic microprocessor settable to a respectively desired, selectable work cycle by means of electronic storage elements or chips to be inserted in it.

For the production of soft foam molded plastic parts the program control unit may be intended or set up to open the valve or valves at the venting canal or canals of the molding die at the beginning of the filling process; set the gas blow-off valve or pressure relief valve to the respectively desired overpressure and open the transport ga supply; control the injector into open position to the mold cavity after the desired pressure has been reached and control the injector into closed position to the mold cavity after the conclusion of the filling process; close the valve or valves at the molding die venting canal or canals and close the transport gas supply to the injector, possibly with time delay, as well as to relieve the pressure equalization system, possibly by briefly opening the gas drain valve, after all of which the program control unit controls the further steps in the molding die work cycle in a manner already known per se.

In the presence of a pressure filling tank with an agitator, i. e. as in the preferred embodiment of the invention, the program control unit also starts the agitator as it opens the transport gas supply to the injector and stops the agitator again at the end of the filling process a it closes the transport gas supply to the injector.

If the pressure equalization system is connected to an additional pressure build-up system via a connecting valve, the program control unit may be designed to open the connecting valve at the beginning of the filling process, but later than opening the transport gas supply to the injector and to close it again after the pressure build-up in cooperation with a pressure monitor.

Where the machine according to the invention contains a pressure filling tank to which a vacuum replenishing device is connected, the program control unit may be designed to start the vacuum replenishing device when the pressure in the pressure equalization system is relieved, and to stop it again in cooperation with a fill level sensor disposed in the pressure filling tank, as well as to prohibit the initiation of a new work cycle or of a new pressure build-up in the pressure equalization system when the vacuum replenishing device is turned on.

BRIEF DESCRIPTION OF THE DRAWINGS

An embodiment example of the invention is explained below in greater detail with reference to the drawing, in which.

DETAILED DESCRIPTION OF THE DRAWINGS

Figure 1:
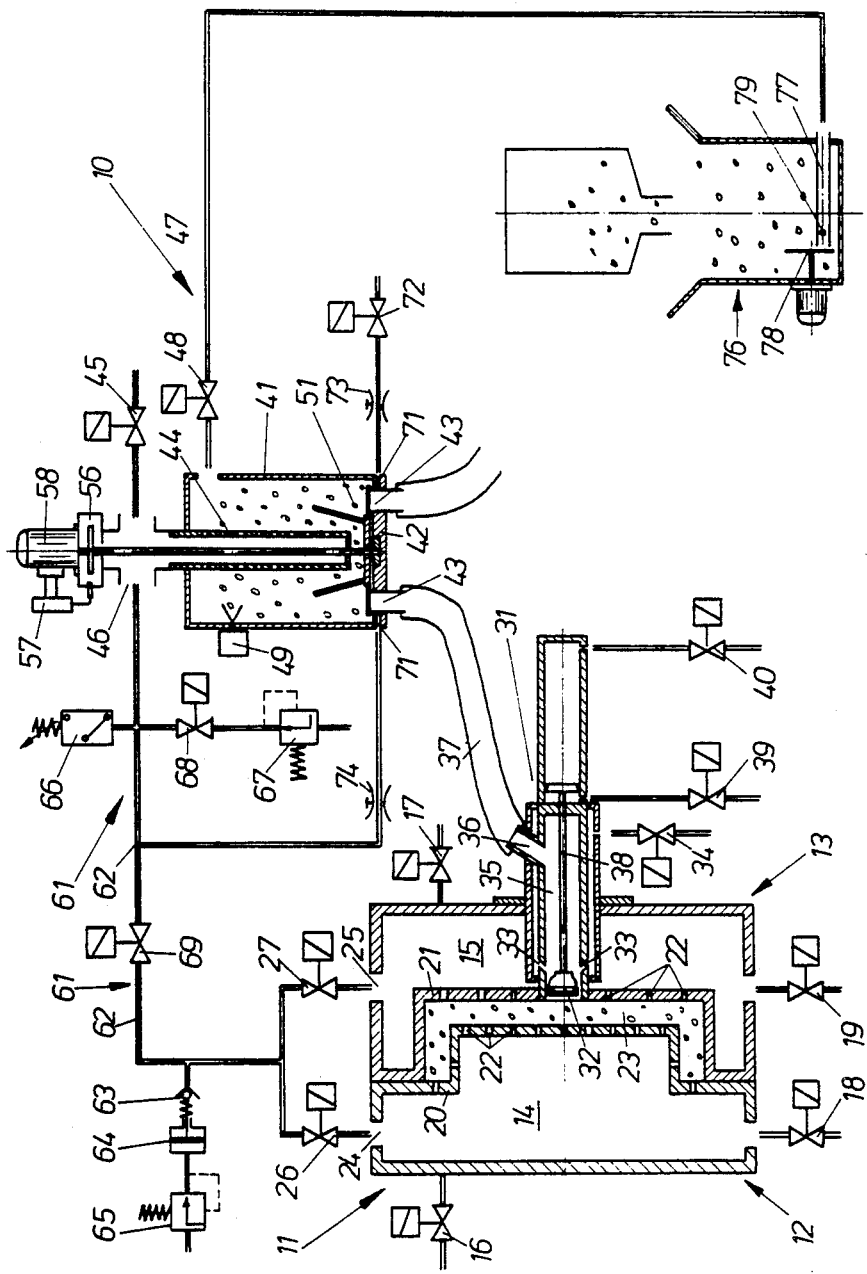
FIG. 1 shows the schematic of a preferred embodiment of the machine according to the invention.
Figure 2:
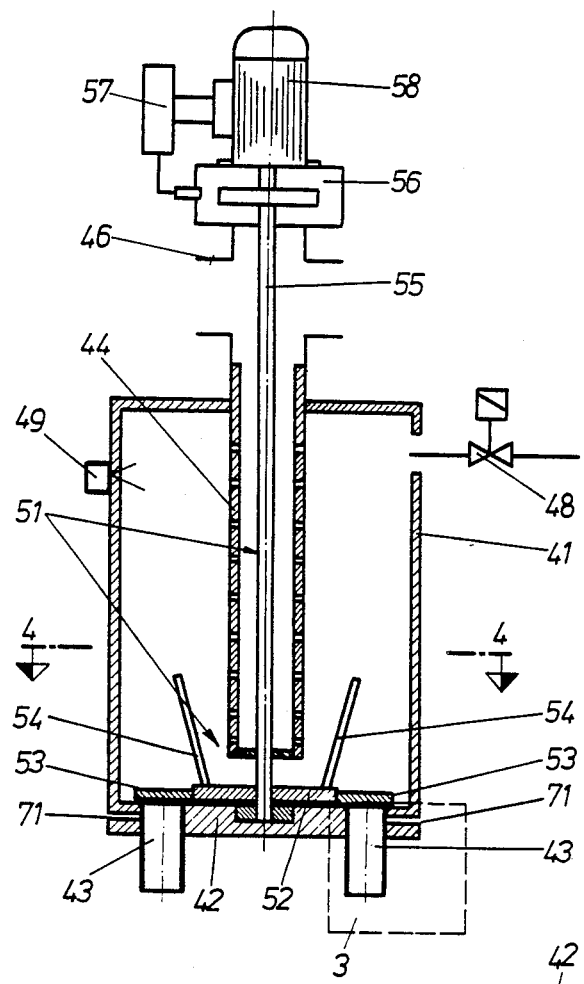
FIG. 2 diagrammatically illustrates the pressure filling tank of the schematic showing of FIG. 1 but on a larger scale.

In the example illustrated, the machine 10 for the production of molded foamed plastic parts contains a molding die 11 with two separable mold parts 12 and 13, namely a shell part 13 and a core part 12. Each one of these mold parts 12 and 13 contains a steam chamber 14, 15 with centrally controlled steam supply valves 16, 17 and condensate drains, and each with centrally controlled condensate drain valves 18, 19, respectively. Provided in the actual mold wall 20 or 21 of the two mold parts 12 and 13 are steam and air passages 22 which connect the mold cavity 23 with the two steam chambers 14 and 15 to which a centrally controlled air discharge valve 26, 27 is connected.

Attached to the one mold part 13, namely the shell part, is an injector 31 to introduce the foam particles to be processed into the mold cavity 23. In its inside region adjacent to its outlet 32 to the mold cavity, the injector contains one or more injector nozzles 33 connected to a transport gas supply via a centrally controlled valve 34. In the transport direction of the foam particles there is formed ahead of the injector nozzles (i. e. on the side of the injector nozzles 33 facing away from the outlet 32) and inside the injector 31 a material supply canal 35 which is connected, via the injector inlet 36, to the material supply line 37 which is a hose in the example shown.

The injector 31 contains a quill 38 which, by means of a cylinder/piston assembly and compressed air operated via centrally controlled valves 39 and 40, is movable from its closed position shown in FIG. 1 into its open position in which the quill head is retracted behind the injector inlet 36, and vice versa. The machine shown in FIG. 1 further contains a pressure filling tank 41 at whose bottom 42 a peripheral (circular) series of outlet holes 43 is formed to which the material supply line 37 to the injector 31 is connected.

If the molding die 10 contains several filling points, then a corresponding number of material outlet holes 43 of the pressure filling tank 41 is connected to one injector 31 each, whereas the other outlet holes 43 are closed. The pressure filling tank 41 contains a central, perforated tube 44 whose end projecting out of the top of the pressure filling tank 41 is connected to a vacuum generator via a centrally controlled vacuum valve 45 and to a gas line 46 of the pressure equalization system described further below. Also connected to the pressure filling tank 41 via a centrally controlled replenishing valve 48 is a raw material replenishing line 47. Furthermore, a fill level sensor 49 for the foam material contained in the pressure filling tank 41 is attached to the latter's wall.

Figure 4:
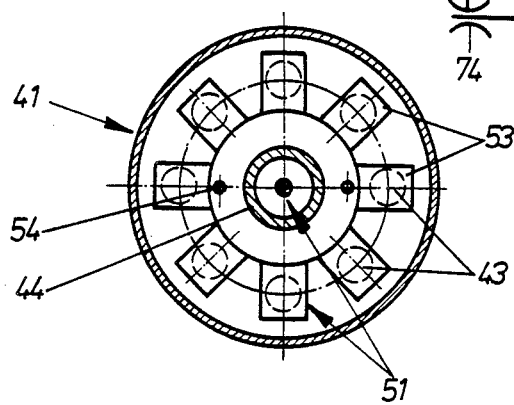
FIG. 4 is a transverse section taken on the line 4—4 of the pressure filling tank of FIG. 2.

The pressure filling tank 41 contains further an agitator 51 which supports at its stirring tool 52 mounted above the bottom 42 of the pressure filling tank 41, stirring and covering elements 53 extending radially. As FIG. 4 shows, these stirring and covering elements 53 are designed and mounted so as to cover the outlet openings 43 in the bottom 42 of the pressure filling tank 41 in one position of the agitator 51. Furthermore, the stirring tool 52 supports two stirring rods 54 which project obliquely upwards into the interior of the pressur filling tank 41.

Attached to the upper end of the agitator shaft 55 which projects out of the pressure filling tank 41, with an electromagnetic clutch 56 interposed, is an agitator motor 58 equipped with a switching device 57 arranged to that when the agitator motor 58 is turned off, the agitator always stops in a position, shown in FIG. 4, in which the covering and stirring elements 53 cover the outlets 43.

Due to one connection to the gas line 46 and one connection to the material supply line 37, the pressure filling tank 41 is included in the pressure equalization system 61 which, in the example illustrated, contains a pressure equalization line 62 going from the venting valves 26 and 27 to the connecting line 46 of the pressure filling tank 41. Therefore, when the venting valves 26 and 27 are open, the same pressure prevails in the pressure filling tank 41 and, via the material supply line 37, also in the material supply canal 35 of the injector 31 as exists in the steam chamber 14 and 15 of the molding die 11 and, via the steam and air passages 22, also exists as in the mold cavity 23.

To equalize the injector air stream blown into the mold cavity 23 through the injector nozzles 33 there is connected to the pressure equalization line 62 a blow-off valve or pressure relief valve 63 which can be set to a desired response pressure by means of a pressure converter 64 and a pressure reducer 65 connected thereto. The excess air supplied through the injector nozzles 33 is let off through the blow-off or pressure relief valve 63, and the desired pressure set on the pressure reducer 65 is maintained in the pressure equalization system 61. This pressure is also monitored by a pressure monitor 66 connected to the pressure equalization line 62 and electrically connected to the central machine control.

In order to be able to build up more quickly, at the beginning of the filling process, the pressure desired in the pressure equalization system 61, a pressure reducer 67 is connected via a centrally controlled connecting valve 68 to the pressure equalization line 62 and to a compressed air source (not shown).

To be able to use the machine according to FIG. 1 also for the production of rigid foam molded plastic parts there is inserted in the pressure equlization line 62 a centrally controlled separating valve 69 which is open when the machine is operated to produce soft foam molded parts and closed when operated to produce rigid foam molded parts. The separating valve 69 may also be designed as multi-way valve which opens the passage of the pressure equalization line 62 for operation of the machine for soft foam molded parts and closes the part of the pressure equalization line 62 facing the pressure filling tank 41 when operating the machine for the production of rigid foam molded parts, connecting the part of the pressure equalization line 62 which faces the venting valves 26 and 27 to the outside air.

At its material outlets 43, to dilute and accelerate the material flow through the material supply line 37, the pressure filling tank 41 is equipped with inlets 71 for additional transport air. As shown in FIG. 1 in the right-hand part of the pressure filling tank 41, these transport air inlets 71 may be connected to an additional compressed air source via a centrally controlled valve 72 and a flow throttle 73. But it is also possible to connect the inlets for the additional transport air to the pressure equalization line 62 via a flow throttle 74, as shown in FIG. 1 to the left of the pressure filling tank 41. This connection is made between the separating valve 69 and the gas line 46 connected to the pressure filling tank 41.

Figure 3:
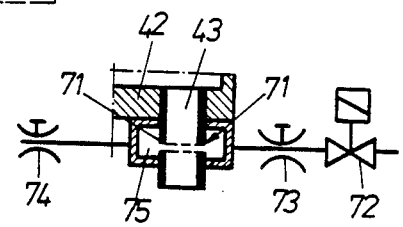
FIG. 3 is a diagrammatic showing of the area indicated by the numeral 3 of FIG. 2, revealing a modified design.

As shown in FIG. 3, the inlets 71 for the additional transport air may be designed in the form of nozzles inclined in the material travel direction and connected to an annular canal 75 attached to the underside of the bottom 42 of the pressure filling tank 41.

Finally, the pressure filling tank 41 is connected via the raw material replenishing line 47 to the suction line 77 of a raw material supply tank 76. In the example shown, an agitator 78 is disposed ahead of the inlet to the suction line 77. Furthermore, air aspiration nozzles 79 which let in air to dilute and accelerate the material flow and communicate with the outside air may be mounted in the suction line 77.

If the machine shown in the drawing is used for the production of soft foam molded parts oFvH for the production of molded parts from greatly frothed rigid foam plastic, the separating valve 69 is always switched so that passage for the pressure equalization line 62 is free. At the start of a work cycle, controlled by a central program control unit not shown, the steam supply valves 16 and 17 and the condensate drain valves 18 and 19 on the molding die 11 are closed. The control valve 40 on the injector 31 is open so that the quill is in its closed position shown in FIG. 1. The vacuum valve 45 and the replenishing valve 48 on the pressure filling tank 41 are closed. The blow-off or pressure relief valve 63 in the pressure equalization system 61 is closed and set to the pressure desired in the pressure equalization system 61. The connecting valve 68 is closed. The central pressure control unit first causes the transport air valve 34 to the injector 31 and the venting valves 26 and 27 on the molding die 11 to open.

Since the quill 38 is in its closed position, the inrushing air coming through the transport air valve 34 flows through the injector nozzles 33 into the material guiding canal 35 and through the material supply line 37 into the pressure filling tank 41 as well as through the gas line 46 and the pressure equalization system 61 through the open venting valves 26 and 27 into the steam chambers 14 and 15 and thence through the steam and air passages 22 into the mold cavity 23 of the closed molding die 11. As soon as this air flow has established itself, the central program control unit causes the connecting valve 68 to open also so that the pressure build-up in the pressure equalization system 61 and in the molding die 11, and in the injector 31 and the pressure filling tank 41 is accelerated. When the desired pressure in the pressure equalization system 61 has been reached, the blow-off or pressure relief valve 63 will respond so that more air coming in through the injector nozzles 33 and the connecting valve 68 is blown off. At the same time, the pressure monitor 66 will respond, causing the central program control unit to close the connecting valve 68 again. Due to the fact that the pressure builds up first from the injector nozzles 33 through the material supply line 37, there is assurance that no material is blown from the pressure filling tank 41 into the material supply line 37 due to the accelerated pressure buildup. Note also that the material outlets 43 of the pressure filling tank 41 are also covered up by the stirring and covering elements 53 of the agitator 51.

As soon as the pressure build-up in the pressure equalization system 61 is complete, the agitator motor 58 is turned on by the central program control unit. Furthermore, the control valve 39 is opened and the control valve 40 is set to its venting position so that the compressed control air flows into the cylinder/piston assembly of the injector 31 on the side adjacent to the quill, moving the quill 38 into its open position in which the quill head is behind the material inlet 36.

When the pressure build-up in the pressure equalization system 61 is complete, the inlet valve 72 for the additional transport air is also opened (initiated by the pressure monitor 66) by the central program control unit so that a dilute, accelerated material flow is now aspirated from the pressure filling tank 41 by the injector 31 and continuously blown into the mold cavity 23. Thus, starting from its edge areas, the mold cavity starts filling up until it is completely filled with foam particles which are compressed on account of the overpressure prevailing in the pressure equalization system 61.

If desired, the pressure reducer 65 may be controlled by the central program control unit in such a manner as to first increase the pressure maintained in the pressure equalization system 61 to e. g. 2 to 2.5 bar. The pressure of the transport air supplied to the injector nozzles 33 may be 6 to 10 bar, it being preferred to provide a 7 to 8 bar pressure. If the initial pressure in the pressure equalization system is 2 to 2.5 bar, the foam particles blown into the edge and corner areas of the mold cavity 23 will be compressed more. This imparts an increased material density and, therefore, a greater strength to the molded parts. As the filling process continues, the pressure maintained in the pressure equalization system 61 may be lowered, e. g. to about 1.5 bar so as to compress the foam particles reaching the wall areas of the mold cavity 23 less. As soon as the mold cavity 23 is filled, the air flows coming from the injector nozzles 33 cannot get into the mold cavity any more. They are deflected by the material layer formed in front of the outlet 32 of the injector 31 and turned back to the pressure filling tank 41 through the material supply line 37 of the injector 31.

In this process, all excess foam particles are blown out of the material supply canal 35, the injector inlet 36 and the material supply line 37 back into the pressure filling tank. Then, initiated by the pressure monitor 66, the central program control unit sets the control valve 39 to its venting position and the control valve 40 to supplying compressed control air so that the quill 38 moves into its closed position shown in FIG. 1.

Furthermore, the transport air valve 34 is closed, as is the possibly present additional transport air valve 72. The blow-off or pressure relief valve 63 is moved into its open position so as to relieve the pressure in the pressure equalization system 61. The agitator 51 is stopped at the same time. Due to the pressure relief, the foam particles introduced into the mold cavity 23 will expand to the extent the mold cavity 23 permits, resulting in reliable, firm, mutual, area contact. The rest of the foam particles contained in the pressure filling tank 41 will also expand again. The central program control unit activates only the known operating steps to steam the material enclosed in the mold cavity 23 until the finished molded part is ejected.

As soon as the pressure in the pressure equalization system 61 is relieved, the blow-off or pressure relief valve 63 is put into the closed position again by the program control unit. At the same time, the vacuum valve 45 and the replenishing valve 48 are opened and the agitator 78 turned on by the program control unit. This causes an underpressure to develop in the pressure filling tank 41 through the perforated tube 44 and foam particles to be aspirated from the raw material supply tank 76 until the fill level sensor 49 responds, giving an appropriate signal to the program control unit so that the latter closes the vacuum valve 45 and the replenishing valve 48 and shuts off the agitator 78. The initiation of a new work cycle, particularly a renewed opening of the transport air valve 34 is blocked in the central program control unit during this replenishing process.

After the ejection of the molded part and closing of the molding die 11 the above described work cycle is repeated.

The pressure to be maintained and to be varied in the pressure equalization system 61 is specified in an electronic storage element, e. g. chip, to be inserted in the central program control unit. If a different material of the same type is to be processed, all that is needed is to insert another, corresponding electronic storage element or chip into the central program control unit. By the same token, the control of the machine shown in the drawing may also be changed over for the processing of a different type material, such as rigid foam plastic, by replacing an electronic storage element or chip. Since hard foam particles are usually still mixed with foaming agents, they can be introduced into the mold cavity 23 without the build-up of an overpressure in the pressure equalization system 61. It is recommended, therefore, for this case to split the pressure equalization line 62 at the separating valve 69 and connect the part of the pressure equalization line 62 going to the venting valves 26 and 27 to the outside air, which can be accomplished by keeping the blow-off or pressure relief valve 63 open constantly or by appropriately setting a separating valve 69 designed a multi-way valve. The filling process or the entire machine work cycle is then controlled by such an electronic storage element or chip for the conventional processing of rigid foam particles.

If greatly frothed rigid foam particles not containing much residual foaming capacity any more are to be processed, the program control unit can be set up by an appropriate electronic storage element so that the work cycle essentially runs as above for the processing of soft foam particles, with correspondingly different pressure conditions in the pressure equalization system 61, however.

I claim:

1. A machine for the production of molded parts from foamed plastic, including soft foam plastics such as expanded olefin polymers and including plastic foam particles greatly expanded in frothing, in which machine there is provided a molding die having a cavity to be filled through a material inlet with expanded or with more or less frothed plastic particles under previously determined gas pressure conditions in its cavity, and in which machine there is a compressed gas operated filling device for the expanded particles, disposed in the material supply system for the molding die, characterized in that the filling device has an injector (31) with at least one injector nozzle (33) disposed in the area of its outlet (32) and connected to the molding die (11) and operating with compressed gas and has a material guiding canal (35) which is disposed ahead of the injector nozzle (33) in the material travel direction and which is connected to the material supply system by means of the material inlet (36), and further characterized in that there is a pressure equalization system (61) adapted to maintain in the material guiding canal (35) of the injector (31) and in the material supply system essentially the same gas pressure as in the cavity (23) of the molding die (11), said pressure equalization system having a venting canal and both the material guiding canal (35) of the injector (31) and the material supply system being connected to said pressure equalization system.

2. A machine according to claim 1, characterized in that the pressure equalization system has a ga blow-off valve (63) which is finely adjustable to the desired gas pressure.

3. A machine according to claim 2, characterized in that the gas blow-off valve (63) has a program control device for effecting temporary variation of the overpressure maintained in the pressure equalization system (61) including temporary application of ambient pressure to the pressure equalization system (61).

4. A machine according to claim 1, characterized in that the pressure equalization system (61) has a valve (69) for its selective interruption.

5. A machine according to claim 4, characterized in that the valve (69) for the selective interruption of the pressure equalization system (61) is constituted as a multi-way valve for connecting to the environment the part of the pressure equalization system (61) going to venting canals (24, 25) of the molding die (11).

6. A machine according to claim 1, characterized in that the material supply system contains a pressure filling tank (41) which can be closed gastight and is adapted to accommodate an amount of material sufficient for at least one mold filling and which has a gastight material supply line (37) connected to the material inlet (36) of the injector (31), and in that a pressure filling tank (41) having a pressure equalization line (62) is included in the pressure equalization system (61) and connected to venting canals (24, 25) of the molding die (11) by valves (26, 27), said pressure equalization system having a pressure regulating device (63) and controlling the pressure in the mold cavity (23) by means of the venting canals (24, 25) of the molding die (11) on the one hand and controlling the pressure in the material guiding channel (35) of the injector (31) by means of the material supply system on the other hand.

7. A machine according to claim 6, characterized in that there is a raw material supply tank (76) and a vacuum replenishing system connected to the pressure filling tank (41).

8. A machine according to claim 6, characterized in that the pressure filling tank (41) has in its lower region (42) a peripheral series of material outlets (43) and an agitator (51) wiping across these material outlets.

9. A machine according to claim 8, characterized in that the agitator (51) has covering elements (53) cooperable with the material outlets (43) and in that there is an arresting device (56, 57) which arrests the agitator (51) in a position in which the covering elements (53) cover the material outlets (43) upon shutting off the agitator (51) drive.

10. A machine according to claim 9, characterized in that each material outlet (43) of the pressure filling tank is equipped with at least one inlet nozzle (71) for a gaseous transport medium to dilute and accelerate the material flow through the material supply line (37) to the injector (31).

11. A machine according to claim 10, characterized in that there is a transport medium source having an adjustable flow throttle (73) and a shut-off valve (72), connected to the inlet nozzles (71).

12. A machine according to claim 11, characterized in that there is an adjustable flow throttle (74) connected to the pressure equalization system (61) and the pressure filling tank (41) in order to use gas from the pressure equalization system (61) as a transport medium.

13. A machine according to claim 1, characterized in that the pressure equalization system (61) has a pressure monitor (66) adapted to allow the outlet (32) of the injection (31) connected to the mold cavity (23) to open only in the presence of the previously determined pressure in the pressure equalization system (61).

14. A machine according to claim 13, characterized in that the pressure monitor (66) is also adapted to allow the pressure filling tank (41) to open only after an overpressure in the pressure equalization system (61) has been relieved.

15. A machine according to claim 13, characterized in that there is a pressure build-up system hasving a pressure reducer (67), a compressed gas source, and a valve (68) connected to the pressure equalizing system (61).

16. A machine according to claim 15, characterized in that the pressure monitor (66) is connected and adapted to control the valve (68) of the pressure build-up system.

17. A machine according to claim 1, characterized in that there is an automatic program control unit for the work cycle, for the purpose of opening the valves (26, 27) at the venting canals (24, 25) of the molding die at the beginning of the filling process, thereafter setting the pressure relief valve (63) to the respectively desired overpressure and opening the transport gas supply valve (34), then operating controlling the injector (31) into open position to the mold cavity (23) after the desired pressure in the pressure equalization system has been reached, and then controlling the injector (31) into closed position with respect to the mold cavity (23) upon the completion of the filling operation, then closing the valves (26, 27) on the venting canals (24, 25) of the molding die (11) and the transport gas supply valve (34) to the injector (31), then relieving the pressure equalization system (61) whereupon the program control unit thereafter controls the additional known steps in the work cycle of the molding die (11).

18. A machine according to claim 17, characterized in that, in conjunction with a pressure filling tank (41) and agitator (51), the program control unit starts the agitator (51) at the beginning of the filling process when it opens the transport gas supply valve (34) to the injection (31) and stops the agitator (51) at the end of the filling process when it closes the transport gas supply valve (34) to the injection (31).

19. A machine according to claim 18, characterized in that, in conjunction with an additional pressure build-up system having a connecting valve (68) to the pressure equalization system (61), the program control unit closes the connecting valve (68) at the beginning of the filling process but after closing the transport gas supply valve (34) to the injection (31), and closes the connecting valve (68) again in cooperation with a pressure monitor (66) after pressure build-up.

20. A machine according to claim 17, characterized in that, in conjunction with a pressure filling tank (41) and attached vacuum replenishing device, the program control unit is adapted to turn on the vacuum replenishing device upon a pressure relief in the pressure equalization system (61) and to shut off the vacuum replenishing device again in cooperation with a fill level sensor (49) disposed in the pressure filling tank (41), and further adapted to prevent the initiation of a new work cycle or of a new pressure build-up in the pressure equalization system (61) when the vacuum replenishing device is activated.

21. A machine according to claim 17, characterized in that the program control unit is switchable to the control of different types of work cycles, including those with or without the use of the pressure equalization system (61), e. g. by employing different electronic storage elements or chips.

* * * * *